United States Patent [19]

Goudard

[11] Patent Number: 4,485,732
[45] Date of Patent: Dec. 4, 1984

[54] MACHINE FOR PITTING DRUPACEOUS FRUITS

[75] Inventor: Yves Goudard, Aurec, France

[73] Assignee: Mecanique Generale J. Deville & Cie Societe Anonyme, Aurec-sur-Loire, France

[21] Appl. No.: 489,699

[22] Filed: Apr. 29, 1983

[30] Foreign Application Priority Data

Apr. 29, 1982 [FR] France .................. 82 07828

[51] Int. Cl.$^3$ .................. A23N 4/00; A23N 4/08
[52] U.S. Cl. .................. 99/549; 99/557; 99/561; 99/565; 426/485
[58] Field of Search .................. 99/547–550, 99/555, 556, 557–561, 565, 566; 426/484, 485

[56] References Cited

U.S. PATENT DOCUMENTS

| 1,024,625 | 4/1912 | Foote | 99/561 |
| 3,731,615 | 5/1973 | Margaroli et al. | 99/565 X |
| 4,313,373 | 2/1982 | Fehlmann | 99/565 X |

FOREIGN PATENT DOCUMENTS 2834985  8/1978  Fed. Rep. of Germany.
1491306  5/1966  France.

Primary Examiner—Timothy F. Simone
Attorney, Agent, or Firm—Karl F. Ross; Herbert Dubno

[57] ABSTRACT

A machine for the pitting of drupaceous fruits, e.g. prunes, has an endless chain of articulated conveyor plates each provided with several vertical cylindrical bores whose flared mouths face upward on the upper run of the chain where each plate passes successively, in steps, through a loading station, a pitting station and an ejection station. The loading station comprises a hopper filling each bore of an underlying conveyor plate with a fruit to be pitted; in the pitting and ejecting stations, the conveyor plates are overhung by a vertically reciprocable carrier supporting a series of pushers and an adjoining series of plungers. In the pitting station the conveyor plates are underlain by a base plate having perforations aligned with their bores, each perforation being provided with an elastic insert which closes around a pit being dislodged by a pusher in order to strip adhering pulp therefrom. Upon the ejection of a pitted fruit from a bore, the bore wall is cleaned by a wiper disk mounted on the plunger stem or by a brush suspended from the reciprocable carrier at a location downstream of the ejection station.

12 Claims, 12 Drawing Figures

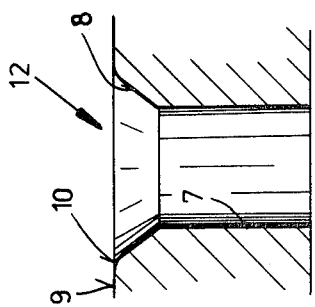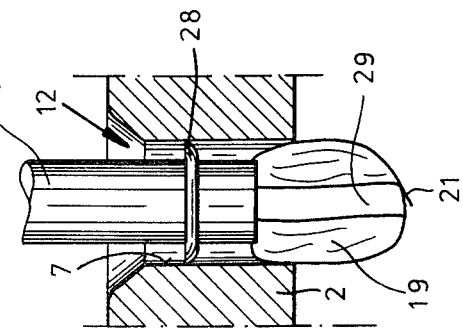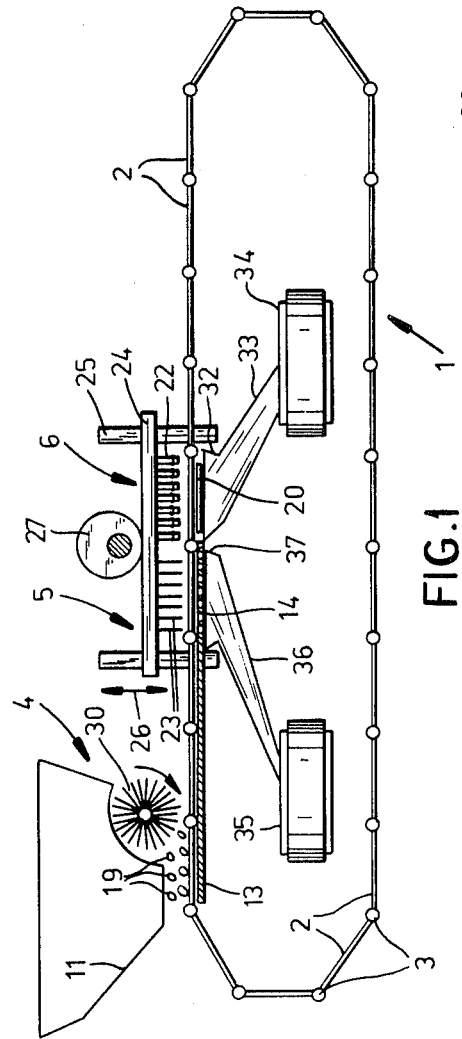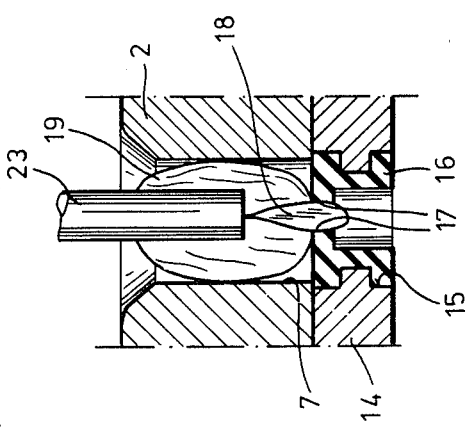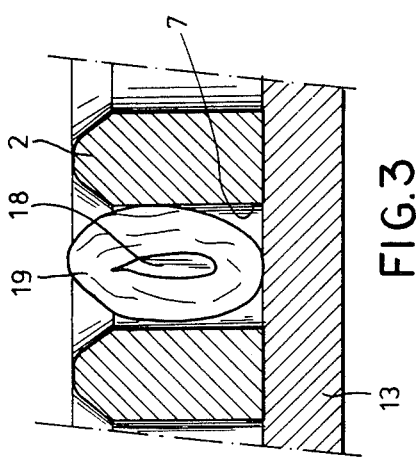

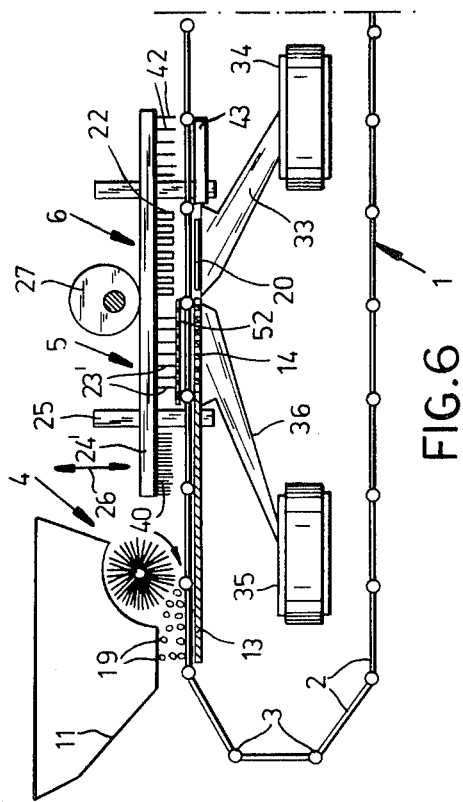
FIG.6
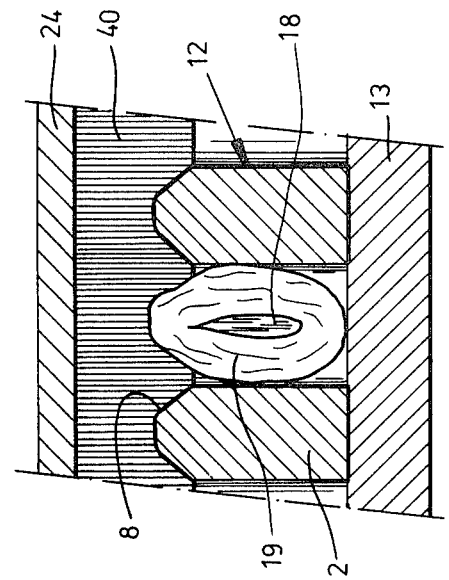
FIG.7
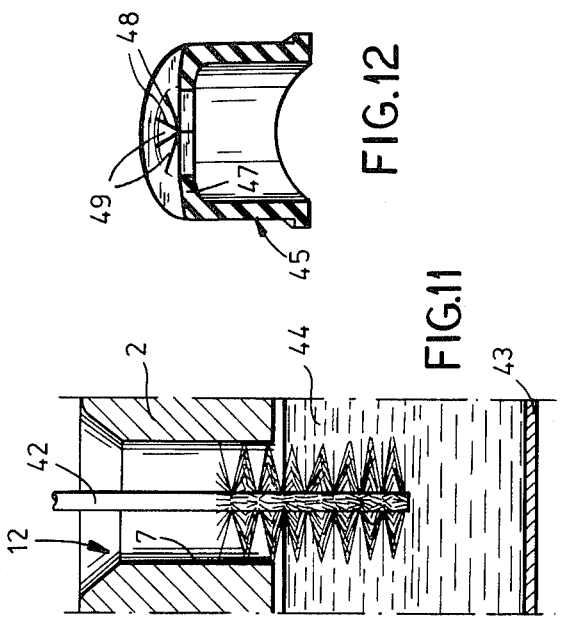
FIG.11
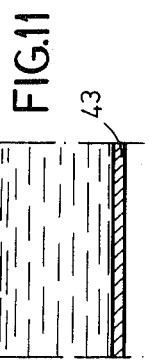
FIG.12
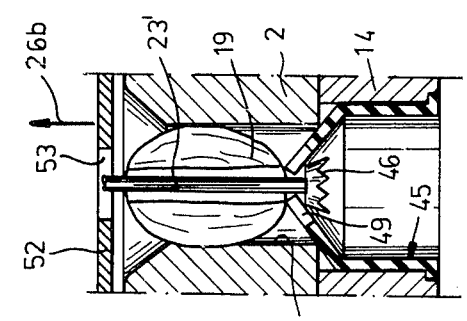
FIG.10
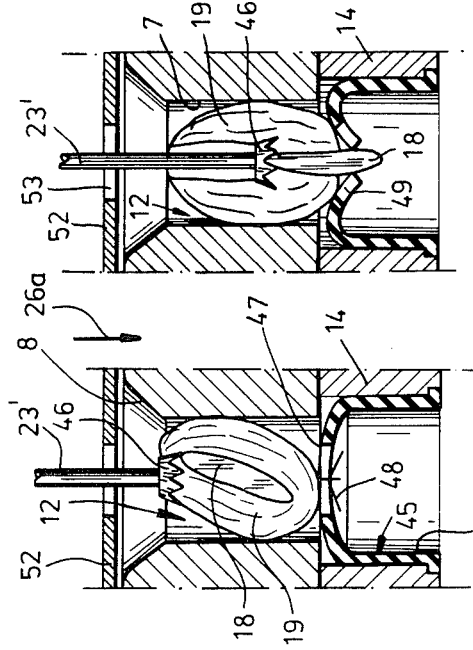
FIG.9
FIG.8

MACHINE FOR PITTING DRUPACEOUS FRUITS

FIELD OF THE INVENTION

My present invention relates to a machine for the pitting of drupaceous fruits, especially those of relatively dry character such as prunes and dates, for example.

BACKGROUND OF THE INVENTION

Pitting machines are known in which the drupes are entrained by a transporter in the form of an endless chain whose links are constituted by hingedly interconnected perforated conveyor plates, the chain being advanced with a stepped motion past a pitting station disposed along its horizontal run. As shown for instance in U.S. Pat. No. 667,423, each plate is provided with an upwardly concave seat of ogival shape designed to receive a drupe. When the seat passes through the pitting station, a pusher or punch descends to dislodge the pit from the pulp of the drupe, specifically an olive to be subsequently stuffed; the pit is being thrust by the pusher through a narrower orifice in the plate. The drupe is subsequently dislodged by gravity from its seat, through the open end thereof, in an inverted position. Especially with prunes and similar fruits of the type referred to above, however, practice has shown that a small fleshy cap underlying its pit tends to remain attached to the pulp and to adhere to the pit-clearing orifice in a manner impeding the subsequent ejection of the drupe. Even if the cap is detached from the body of the fruit, its fragments may contaminate the seat so as to interfere with the further operations. This problem is less severe with softer fruits, such as cherries or apricots, but is aggravated with prunes, dates or the like by the fact that these fruits are generally prewetted with water in order to separate them from a heap for individual passage through a hopper at a loading station preceding the pitting station. In fact, the juice of these fruits when diluted with water has the character of a fairly strong adhesive.

OBJECTS OF THE INVENTION

An object of my present invention, therefore, is to provide a pitting machine for drupaceous fruits which obviates the contamination problem referred to.

A related object is to provide means in such a machine for effectively cleaning each drupe seat immediately after a pitted fruit has been ejected therefrom.

SUMMARY OF THE INVENTION

A machine embodying my invention comprises an intermittently removable transporter with a succession of cylindrical bores, preferably the upper run of a chain with hingedly interlinked conveyor plates as discussed above. Each bore of the transporter is centered on a vertical axis on its successive passage through a loading station, a pitting station and an ejection station, the upper end of the bore being shaped into a flared mouth. Below these upwardly facing mouths the bores are provided with a constant diameter substantially corresponding to that of a drupe to be pitted, such drupe being introduced into each bore by hopper means at the loading station. The pitting station includes vertically reciprocable pusher means insertable from above into bores aligned therewith for dislodging the pits of the drupes contained therein. The ejection station includes vertically reciprocable plunger means also insertable into the bores from above for discharging the pitted drupes therefrom.

Pursuant to an important feature of my invention, a base underlying the bores of the transporter at the pitting station has one or more apertures—depending on the number of drupes to be pitted simultaneously—each having an elastic rim which is centered on the axis of a bore aligned therewith, this rim being dimensioned to close around a pit dislodged from the aligned bore by the associated pusher means in order to strip adhering pulp from that pit. This causes the aforementioned fleshy cap to be completely severed from the pulp and dislodged with the pit or else to withdraw into the pulp at the location vacated by the pit so as to remain well separated from the bore wall. The pits and the pitted drupes are directed to different destinations by first and second guide means respectively positioned underneath the apertured base at the pitting station and directly below the transporter at the ejection station. When the transporter is designed as an endless chain with an upper and a lower run, the apertured base and the guide means will be disposed between the two runs.

In the embodiments more particularly described hereinafter, in which such a chain is used, each conveyor plate of the chain has a predetermined number of drup-receiving bores which are aligned with repsective pushers at the pitting station and with respective plungers at the ejection station when the chain temporarily halts between intermittent advances. Advantageously, the pushers and the plungers are mounted on a common carrier which overhangs a pair of adjoining conveyor plates in these two stations and is vertically reciprocable for the dislodgment of a number of pits and the removal of a like number of drupes at the same time. The same carrier may be provided upstream of the pitting station with rotatable brush means having depending bristles for forcing incompletely inserted drupes fully into the bores of a conveyor plate about to enter the pitting station, and/or downstream of the ejection station with a set of wipers insertable into the bores of an aligned conveyor plate for cleaning the peripheral walls thereof. Instead of these separate wipers I may provide each plunger with a stem narrower than the bores, this stem carrying an annular wiper which scrapes the peripheral wall of a bore into which the stem has descended.

In accordance with a more particular feature of my invention, each pit-hugging aperture or orifice of the base underlying the transporter in the pitting station is defined by an elastic insert received in a perforation of that base. The insert preferable is substantially of inverted-cup shape with the top forming the aperture. In some instances it will be desirable to have the lower end of a pusher pass through this aperture in dislodging a pit; thus, the pusher may comprise a rod with a rimmed head such as a downwardly diverging crenellated crown at its lower end designed to engage a pit that is somewhat inclined to the vertical; the top of the insert may then be provided with a plurality of radial slits dividing the rim of its aperture into an annular array of sectoral flaps or leaves giving passage to that head upon a descent of the rod.

BRIEF DESCRIPTION OF THE DRAWING

The above and other features of my invention will now be described in detail with reference to the accompanying drawing in which:

FIG. 1 is a somewhat diagrammatic side-elevational view of a prune-pitting machine embodying my invention;

FIG. 2 is a fragmentary cross-sectional view, drawn to a larger scale, which shows the shape of a prune-receiving bore in a conveyor plate forming part of an endless conveyor chain of the machine of FIG. 1;

FIGS. 3, 4 and 5 are views generally similar to FIG. 2, showing the successive loading of a prune into the bore, the removal of its pit and the ejection of the remaining pulp;

FIG. 6 is a side-elevational view, similar to part of FIG. 1, showing a modified machine according to my invention;

FIGS. 7-10 are views generally similar to FIGS. 2-4, showing the treatment of a prune at different stations of the machine of FIG. 6;

FIG. 11 is a further view similar to the four preceding ones, illustrating the cleaning of a bore by a wiper; and FIG. 12 is a sectional perspective view of an aperture-forming insert in a base underlying the bore shown in FIGS. 8-10.

SPECIFIC DESCRIPTION

As shown schematically in FIG. 1, a machine for the pitting of prunes in accordance with my invention comprises an endless conveyor chain 1 consisting of a multiplicity of identical conveyor plates 2 hingedly interlinked at 3. Not illustrated are driving and deflecting wheels, of correspondingly polygonal contour, used for supporting the chain 1 and intermittently advancing same by steps equal to the length of a plate 2. Each conveyor plate passes successively, on the upper run of the chain, through a loading station 4, a pitting station 5 and an ejection station 6. The loading station 4 comprises a hopper 11 from which prunes 19 are deposited on the upper run of the chain for insertion into respective bores 12 thereof; supernumerary prunes lodged on the upper surface of a plate 2 are swept off by a rotary brush 30 as is well known in the art. Each bore 12, as best seen in FIG. 2, comprises a cylindrical well 7 which in the loading, pitting and ejection positions is centered on a vertical axis and has a substantially frustoconical upper end forming a flared mouth 8 that is faired into the upper plate surface 9 by a rounded peripheral edge 10. The diameter of well 7 substantially corresponds to the average diameter of a prune 19.

In the region of loading station 4 and pitting station 5, as well as in the intervening area, the upper run of chain 1 is underlain by a fixed plate-shaped base 13 which forms a sliding support for the plate 2 and is solid except for an apertured extension 14 at the pitting station. This extension is provided with a series of profiled perforations 15, see FIG. 4, occupied by respective elastic inserts 16 which are generally of inverted-cup shape with a top forming an aperture or orifice of substantially smaller diameter than well 7, designed to give passage to a pit 18 of a prune 19 lodged in that well. Each perforation 15 is in line with a repsective pusher 23 mounted on a vertically reciprocable carrier which spans stations 5 and 6, this carrier being shown as a platform 24 guided on vertical posts 25 and displaceable with the aid of a mechanism schematically represented by a cam 27 as indicated by an arrow 26. When a plate 2 is arrested at station 5, its bores 12 are centered on respective pushers 23 which immediately thereafter descend to drive the pits 18 of the conveyed prunes 19 through the apertures 17 of inserts 16 whose rims yield resiliently to hug the pits 18 and strip any adhering fleshy substance therefrom. In particular, a portion of the pulp lying directly below the pit before the descent of the pushers is driven completely through the restricted aperture 17 or, possibly, leaves a residue 21 attached to the pulp as illustrated in FIG. 5; as the pusher recedes, the aperture 17 contracts and confines such an attached residue to a channel 29 left in the pulp.

Upon exiting from station 5, a plate 2 carrying seven pitted prunes 19 is laterally supported by two transversely spaced rails 20 leaving the lower ends of its bores 12 entirely unobstructed. When halting in ejection station 6, these bores are aligned with respective plungers 22 also mounted on the reciprocating platform 24 so as to descend simultaneously with the pushers 23 for discharging the prunes therefrom. As seen in FIG. 5, each plunger 22 comprises a stem whose diameter is substantially less than that of well 7 and which is provided in the vicinity of its lower end with an annular wiper disk 28 of elastic material. As the stem of plunger 22 drives a pitted prune 19 out of the aligned bore 12, the disk 28 sweeps the entire peripheral wall of well 7 to remove any adhering pulp fragment or juice. A funnel 32 below rails 20 intercepts the discharged prunes and directs them via a guide 33 onto a cross-conveyor 34 carrying them to a packing station; a similar guide 36 with funnel 37 lies below the apertured base extension 14 to direct the dislodged pits onto a cross-conveyor 35 which carries them to a disposal site or some other destination. The two cross-conveyors 34, 35 and their guides are positioned between the upper and lower runs of chain 1.

FIG. 6 shows part of a machine similar to that of FIG. 1 wherein, however, the platform 24 has been replaced by a longer platform 24' extending upstream past pitting station 5 and downstream past ejection station 6. The upstream extension of platform 24' carries a non-rotating brush 40 with depending bristles, best seen in FIG. 7, whose purpose is to erect prunes 19 that have become only partly lodged in bores 12 of a plate 2 and to push such prunes fully into the well of those bores. Pushers 23', depending from platform 24' at pitting station 5, comprise slender rods whose lower ends, as best seen in FIGS. 8-10, are provided with downwardly diverging crenellated crowns 46 whose teeth are designed to grip a pit 18 that is tilted relatively to the vertical as seen in FIG. 8. Perforations 50 in the apertured extension 14 of base plate 13 are of cylindrical shape, with a diameter exceeding that of the wells 7 of bores 12, and are occupied by elastic inserts 45 of inverted-cup shape each having a domed top 47 formed with a multiplicity of radial slits 48 which divide a central part of that top into an annular array of sectoral flaps or leaves 49. When a pusher 23' descends to the bottom of an aligned bore 12, as indicated by an arrow 26a in FIG. 8, flaps 49 yield to form an aperture or orifice giving passage to the pit 18 as well as to the crown 46 as seen in FIGS. 9 and 10. The flaps, closely hugging the descending pit, prevent any part of the pulp displaced by that pit from coming into contact with the peripheral wall of well 7. When the pusher 23' subsequently ascends, as indicated by an arrow 26b in FIG. 10, it spreads the flaps 49 apart to prevent their gripping the pulp between them; the pitted prune is slightly lifted in the process. The flaps are then free to return to their normal position, shown in FIG. 8, in which they are substantially level with the underside of the overlying plate 2. This avoids any possible entanglement which would interfere with the subsequent advance of the plate. A stationary shelf 52 overlying the chain 1 in the pitting station 5, provided with holes 53 clearing the crowns 46 of pushers 23', prevents an upward extraction of a prune through entrainment by a receding pusher.

The shape of an insert 45 with its domed top 47, radial slits 48 and sectoral flaps 49 is more clearly illustrated in FIG. 12.

Plungers 22 carried on platform 24' at ejection station 6 are similar to those of FIGS. 1 and 5 but any lack the wiper disks 28 of the former since, in the machine of FIG. 6, a set of separate wipers 42 (corresponding in number to pushers 23' and plungers 22) are non-rotatingly disposed on the downstream extension of that platform for entering the bores of a conveyor plate 2 which has just left the ejection station 6. As seen in FIG. 11, each wiper 42 is in the form of a cylindrical brush whose diameter corresponds to that of well 7, its bristles dipping into water or some other cleaning liquid 44 contained in a reservoir 43 which is disposed just beyond rails 20. With the descent of platform 24', brushes 42 are immersed in the liquid 44 which helps them clean the peripheral bore wall upon the subsequent ascent of the platform.

It will be apparent that the erecting brush 40 and/or the wiper group 42 could also be combined with pushers 23 and inserts 16 of the preceding embodiment. Furthermore, chain 1 could be replaced by a different type of transporter such as, for example, a turntable.

I claim:

1. A machine for the pitting of drupaceous fruits, comprising:

an intermittently movable horizontal transporter with a succession of cylindrical bores each centered on a vertical axis and provided with a flared upwardly facing mouth, said bores being provided below said mouth with a constant diameter substantially corresponding to that of a drupe to be pitted;

a loading station, a pitting station and an ejection station disposed in the path of said transporter for successive traverse by a given bore thereof, said loading station including hopper means for filling each passing bore with a drupe, said pitting station including vertically reciprocable pusher means insertable from above into bores aligned therewith for dislodging the pits of drupes contained therein, said ejection station including vertically reciprocable plunger means insertable from above into bores aligned therewith for discharging the pitted drupes therefrom;

a base underlying the bores of said transporter at said station, said base having at least one aperture with an elastic rim centered on the axis of a bore aligned therewith, said rim being dimensioned to close around a pit dislodged from the aligned bore by said pusher means for stripping adhering pulp from said pit;

first guide means disposed underneath said base for directing dislodged pits to a first destination; and second guide means disposed underneath said transporter at said ejection station for directing discharged pitted drupes to a second destination, said transporter being an upper run of an endless chain, said base and said guide means being disposed between said upper run and a lower run of said chain, said chain comprising a multiplicity of hingedly interlinked conveyor plates each formed with a group of said bores, said pusher means comprising a number of parallel pushers equal to the number of bores in a conveyor plate, said pushers being individually aligned with the bores of a conveyor plate arrested in said pitting station, said plunger means comprising a number of parallel plungers equal to the number of bores in a conveyor plate, said plungers being individually aligned with the bores of a conveyor plate arrested in said ejection station, said pushers and said plungers being provided with a common reciprocable carrier overhanging a pair of adjoining conveyor plates of said upper run in said pitting and ejection stations, said carrier being provided downstream of said ejection station with a set of wipers insertable into the bores of an aligned conveyor plate for cleaning the peripheral walls thereof.

2. A machine as defined in claim 1 wherein said carrier is provided upstream of said pitting station with rotatable brush means having depending bristles for forcing incompletely inserted drupes fully into the bores of a conveyor plate about to enter said pitting station.

3. A machine as defined in claim 1, further comprising a container of cleaning liquid underlying a conveyor plate aligned with said wipers, the latter dipping into the liquid of said container after traversing the aligned bores on a downstroke of said carrier.

4. A machine as defined in claim 3, further comprising rail means at said ejection station for supporting a conveyor plate arrested therein at locations spaced from the bores thereof.

5. A machine as defined in claim 1 wherein said base has a perforation fitted with an elastic insert defining said aperture.

6. A machine as defined in claim 5 wherein said insert is substantially of inverted-cup shape with a top forming said aperture.

7. A machine as defined in claim 6 wherein said pusher means comprises a rod with a rimmed head on a lower end thereof.

8. A machine as defined in claim 7 wherein said top is provided with a plurality of radial slits dividing said rim into an annular array of sectoral flaps giving passage to said head upon a descent of said rod.

9. A machine as defined in claim 8 wherein said pitting station is provided with a fixed stop overlying the mouth of a bore aligned with said rod for preventing upward extraction of a drupe penetrated by said rod, said stop having a hole accommodating said rod.

10. A machine as defined in claim 8 wherein said head is a downwardly diverging crenellated crown.

11. A machine as defined in claim 1 wherein said plunger means comprises a stem narrower than said bore provided with an annular wiper scraping the peripheral wall of a bore into which said stem has descended.

12. A machine as defined in claim 1 wherein said mouth has a rounded edge faired into an upper surface of said transporter.

* * * * *